April 24, 1956  D. C. ERDMAN ET AL  2,743,429
AUTOMATIC POSITIONING DEVICE
Filed Oct. 14, 1950  2 Sheets-Sheet 1

INVENTOR.
DONALD C. ERDMAN
GEORGE B. GREENE
BY
James B. Christie
ATTORNEY

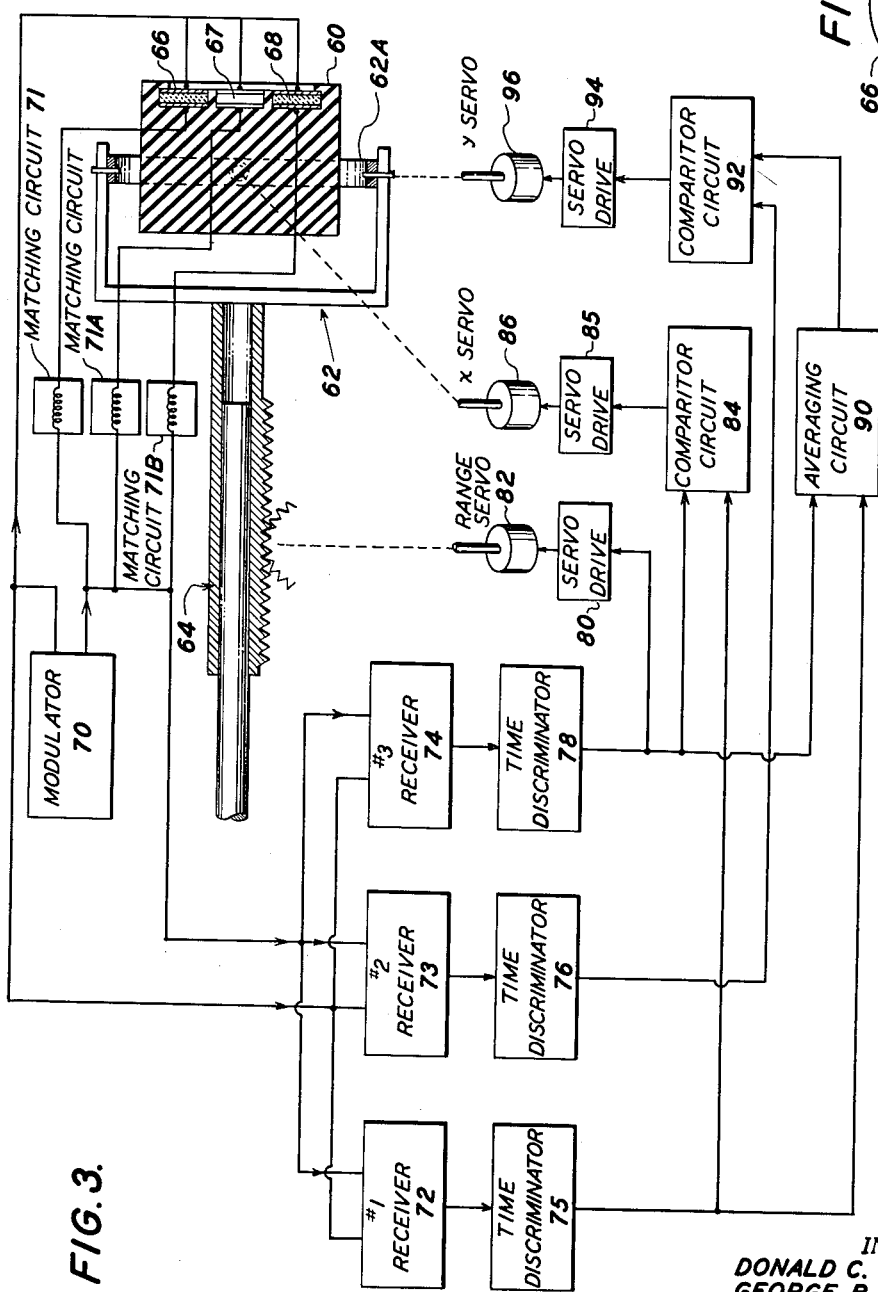

United States Patent Office 2,743,429
Patented Apr. 24, 1956

2,743,429
AUTOMATIC POSITIONING DEVICE

Donald C. Erdman and George B. Greene, Pasadena, Calif., assignors, by mesne assignments, to Electrocircuits Incorporated, Pasadena, Calif., a corporation of California Application October 14, 1950, Serial No. 190,078

7 Claims. (Cl. 340—1)

This invention is directed to methods and apparatus for maintaining objects in fixed spatial relationship with regard to linear separation as well as angular orientation with respect to one or more axes. The invention has particular application for maintaining a scanning instrument such as a photoelectric cell, ultrasonic transducer, camera, etc., or any other instrument or device at a prescribed distance, and, in preferred practice, at a prescribed angle to a contoured surface without physical contact between the two and when one of the objects is in motion with respect to the other.

Radar ranging is well known, although there is no presently known use of radar for ranging and angularly orienting one object with respect to a surface of or a discontinuity in a spaced object. Moreover, radar or any form of electromagnetic waves are limited in their suitability for such a purpose because of the velocity of such waves. The minimum useful range of ranging devices involving pulsed electrical waves is approximately fifty yards. Such a device is therefore of no value in many technical and scientific applications wherein scanning is accomplished by suitable scanning means located within a matter of a few feet to within fractions of inches from a surface to be scanned.

We have found that such ranging and orientation may be accomplished by means of ultrasonics since the velocity of such waves is extremely low as compared to radar or other radio waves. The method and apparatus of the invention permits locating and maintaining a given object at a controllable distance from a surface and to hold the object normal to the surface or at some fixed deviation from normal while permitting relative motion between the object and the surface. This may be done without any physical connection between the object and the surface and without any prior knowledge of the contour of the surface, as will be more fully apparent hereinafter.

The invention contemplates in one aspect the method of maintaining a controllable spatial relationship between two objects which comprises mounting a source of ultrasonic waves in fixed spatial relationship to one of the objects, generating ultrasonic waves at the source and directing them toward the other object, sensing the time interval, or other equivalent function of distances, required for propagation and reflection of the waves to and from the other object and continuously controlling the position of one of the objects to maintain that time interval at a controlled value which may be fixed or variable with time.

This control may be carried out automatically by electrical time comparative means designed to develop an electrical signal proportional to any differential between the predetermined time interval and the sensed time interval. The electrical signal thus developed is conveniently used to energize a servo system connected to move one of the objects in the appropriate direction to eliminate the time differential and nullify the signal. If the predetermined time interval is held constant, the objects will be held in fixed spatial relationship. If the predetermined time interval is varied, as for example as a function of time, the spacing of the objects will be varied accordingly.

One embodiment of the invention comprises the method of maintaining a predetermined and fixed spatial relationship between two objects by mounting a plurality of sources of ultrasonic waves in fixed spatial relationship to one of the objects and spaced from each other, generating ultrasonic waves at each of the plurality of sources and directing these waves toward the other of the objects, comparing the time intervals required for propagation and reflection of the waves from each of two of the sources to and from the other object, continuously controlling the orientation of one of the objects about an axis normal to a line intersecting the midpoints of the two sources to maintain a predetermined difference between the aforementioned time intervals, sensing the time interval required for propagation and reflection of the waves from one of the sources to and from the other object and continuously controlling the position of one of the objects to maintain that time interval at a predetermined value.

In this manner not only is the linear spacing between the two objects determined and maintained but also the angular orientation between the two objects is maintained in one or more planes.

The invention also contemplates apparatus adapted to carry out the foregoing described methods and comprising in one embodiment a source of ultrasonic waves adapted to be affixed to one of the objects whose relative positions are to be controlled and in fixed spatial relationship to that object, means for causing the source to generate ultrasonic waves and to propagate the same toward the other object, receiving means for sensing the reflection of such waves from the other object, means for developing an electrical signal of a magnitude and sense proportional to the time difference between the time interval required for propagation and reflection of the wave and a controlled time interval, and means sensitive to the magnitude and sense of this signal to control the position of one of the objects so as to maintain the aforementioned time difference at a substantially null value.

To carry out the second of the aforementioned methods the apparatus above described need only be modified by the inclusion of one or more additional ultrasonic wave sources and the necessary circuit elements to compare the time required for propagation and reflection of waves originating at two or more of the sources so as to derive a bipolar signal proportional to the difference between these time intervals.

The invention is illustrated and particularly described with reference to its use in maintaining objects in fixed spatial relationship and will be more clearly understood by reference to the accompanying drawing in which:

Fig. 3 is a still more complete embodiment of the invention adapted to control range and angular orientation about two or more axes; and Fig. 4 is an elevation of the ultrasonic transducer holder of Fig. 3.

Figure 1:
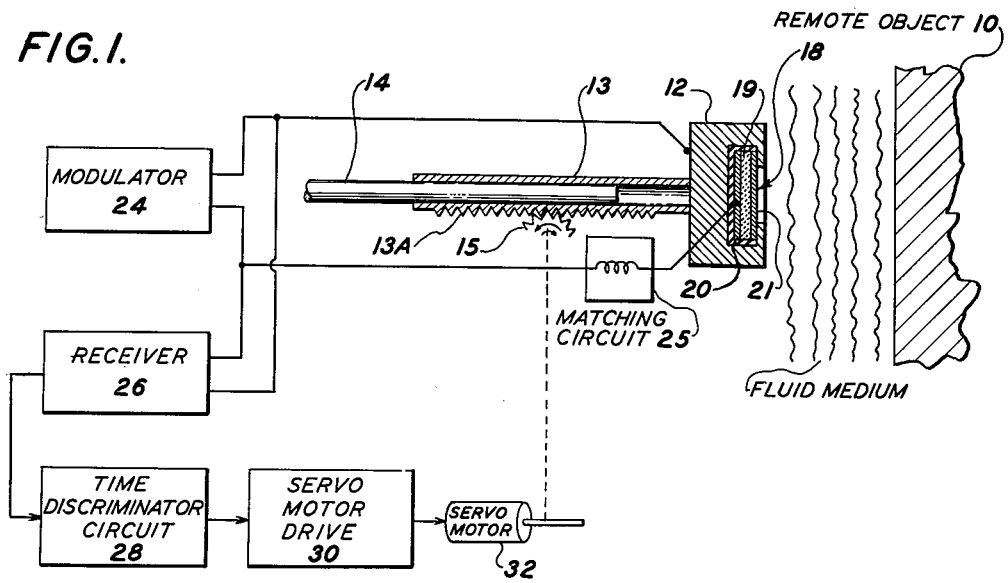
Fig. 1 is a diagram of a simplified embodiment of the invention.

Referring to Fig. 1, the two objects which are to be maintained in fixed spatial relationship are represented by element 10 designated as a remote object and a member 12. The member 12 is mounted on a sleeve 13 which in turn is slidably mounted on a fixed shaft 14. A ratchet 13A is formed on the sleeve and a spur gear 15 is mounted in engagement with the ratchet 13A. The illustrated arrangement is schematic only to illustrate the adjustability of the member 12 with respect to the remote object 10. Any of the substantially innumerable means of providing linear movement of the object 12 may be used and controlled by the means hereinafter described. An ultrasonic transducer 18 is mounted in the object 12 and in this embodiment constitutes a quartz crystal 19 having thin metal coatings 20, 21 on its opposite faces. The crystal is mounted in the member 12 with the metal coating 20 on the inner face thereof being insulated from the member, and the metal coating 21 on the outer face being in electrical contact with the member for connection to ground. A modulator 24 is connected across the opposite faces of the crystal 19 through a matching circuit 25 and delivers impulses to the crystal in response to which the crystal generates ultrasonic waves. The matching circuit, which may be a simple inductance coil or a more complex circuit, is necessary to match the impedances of the transducer and the coaxial transmission line.

As is well known, sound waves of any frequency will not travel in vacuum and it is essential to the practice of the invention that some fluid medium, either liquid or gaseous, be interposed between the objects whose relative positions are to be controlled.

The nature of an ultrasonic transducer of the type shown is such as to have a characteristic frequency which is neither controlled nor determined by the repetition rate of the impulses delivered from the modulator. For this reason any reflected waves picked up by the transducer will be of a frequency characteristic to the transducer and which may be readily sorted from the pulses delivered by the modulator 24, and may be received in a conventional type of receiver tuned to the frequency of the transducer. The receiver develops an electrical signal upon receipt of reflected waves picked up by the transducer. This signal is fed to a time discriminator circuit 28 which in this instance is set to deliver an electrical signal when the time interval between propagation and reflection of the ultrasonic waves differs from a predetermined interval, the polarity of the signal depending upon whether the sensed time interval is larger or smaller than the predetermined interval. This signal is fed to a servomotor drive 30 wherein it is amplified and fed to a servomotor 32. The motor is driven responsive to a signal received from the motor drive 30 and is so connected to the spur gear 15 to displace the object 12 with respect to the object 10 in a direction tending to nullify the time difference in response to which the energizing signal is developed. Time discriminator circuits are discussed under the heading of Time Demodulators in volumes 19 and 20 of the Radiation Laboratory Series, McGraw-Hill Book Company, Inc., 1949.

The object 12 is shown simply as a metal block containing the ultrasonic transducer 18. Although the several illustrations show crystal transducers, magnetostrictive transducers may be used with substantially equal facility. In utilizing the invention for maintaining the object 12 at a fixed distance from the remote object 10, the object 12 will generally carry a scanning device or other instrument. This auxiliary device or instrument may constitute another ultrasonic transducer as found in ultrasonic flaw detectors, or it may constitute any of a large number of scanning instruments, or, in general, any instrument in which the relationship between the instrument and the object 10 may be of importance.

The apparatus of Fig. 1 is designed solely for controlling the range between the objects 10 and 12 when they are moved laterally with respect to each other and particularly when the surface of the object 10 is contoured.

Figure 2:
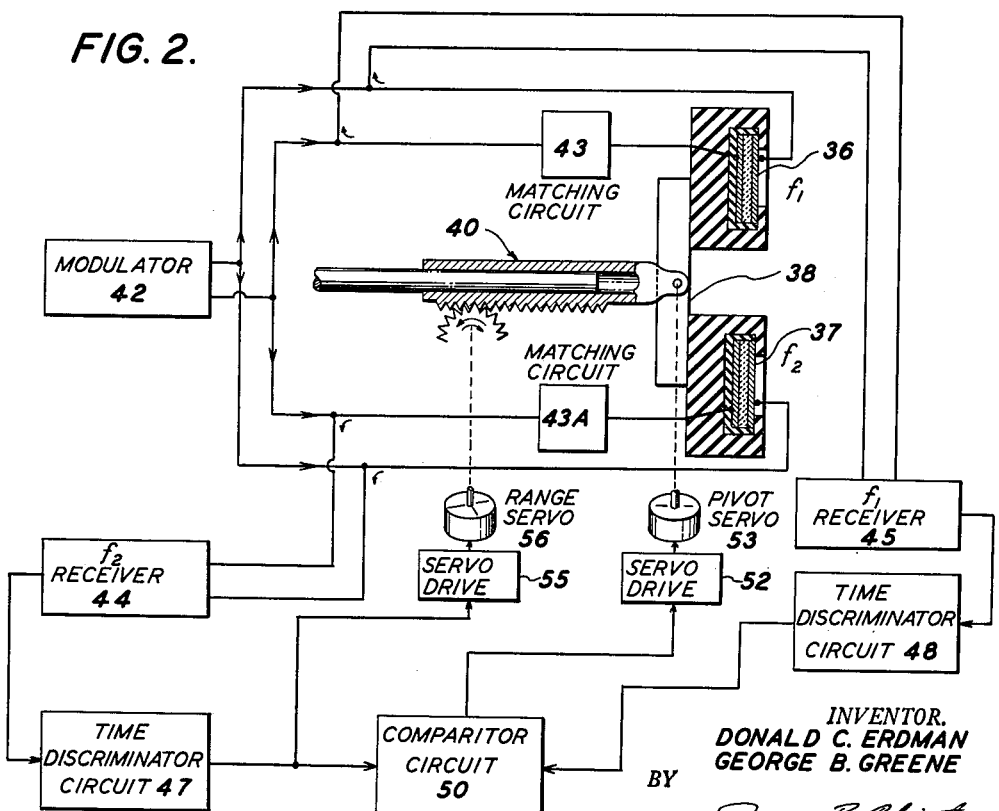
Fig. 2 is a diagram of a more elaborate embodiment of the invention adapted to control range and orientation about one axis.

In Fig. 2, apparatus is shown schematically for controlling range as well as angular orientation about a single axis. This apparatus includes two transducers 36, 37 mounted on a common support 38 and spaced from each other. The support 38 is in turn pivotally mounted to a sleeve and ratchet arrangement 40 symbolically representing any means for effectuating linear movement of the member 38 and the transducers which are carried by the member 38. The axis of rotation of the member 38 is normal to a line drawn between the transducers 36 and 37, the purpose of this relationship being apparent in the following description. A modulator 42 is connected through matching circuits 43, 43A to deliver energizing signals to the transducers 36 and 37 to propagate the ultrasonic waves toward the remote object (not shown in this figure). In this instance the fundamental frequencies of the transducers 36, 37 differ and are identified respectively as $f_1$ and $f_2$. Receivers 44, 45 are tuned respectively to frequencies $f_2$ and $f_1$ and are connected to the transducers 37, 36 to sense waves reflected back to the transducers from the remote object. As in the circuit of Fig. 1, each of the receivers feeds a signal to time discriminator circuits 47, 48, respectively, which in turn compare the sensed time interval between propagation and reflection of the sound waves with a predetermined time interval and develop electrical signals responsive to any difference between the sensed time intervals and corresponding predetermined time intervals. In this instance if the member 38 is to be held normal to the remote object, the predetermined interval for propagation and reflection will be the same for each transducer. However, if some fixed deviation from normal is to be maintained, the predetermined intervals in each case will be different. These intervals are set up electrically in the time discriminator circuits by means which are well known in the art. A comparator circuit 50 is connected to receive signals from the time discriminator circuits 47 and 48. A servo drive unit 52 is connected to the output of the comparator circuit and drives a so-called pivot servo 53. When no signals or when signals of equal magnitude are delivered from the two time discriminator circuits, no signal will be delivered from the comparator circuit and servo 53 will be inoperative. If the time discriminator circuit signals are unequal, the comparator circuit will deliver a sensible signal proportionate to the inequality, and the servo 53 will be driven to rotate the member 38 about its pivot point to overcome this inequality.

It should be remembered that no signals or signals of equal magnitude may be delivered from the two time discriminator circuits even though the time interval for propagation and reflection of waves from the two transducers differs, since if it is desired to maintain the member 38 at a fixed angular deviation from normal, different predetermined time intervals will be set up in the two time discriminator circuits for this purpose. Moreover, the magnitude of the developed error signal is independent of the amplitude or strength of the echo, but is dependent only on the sensed time difference.

A second servo drive unit 55 is connected to drive a so-called range servo 56. The servo drive unit 55 may be connected to receive a signal from either of the time discriminator circuits, in this particular instance it being connected to the discriminator circuit 47. Any signal developed in this circuit will drive the range servo 56 to vary the linear displacement between the member 38 and the remote object. On the surface it might appear that the range servo and pivot servos would buck each other and equilibrium could never be established. This, however, need not be the case since the time lag of the range servo may be made great in comparison to that of the pivot servo, or other well known servo stabilizing expedients may be adapted to eliminate hunting.

A still more useful system is shown in Fig. 3. In this figure a member 60 is mounted in a gimbal 62 so as to be rotatable on two axes normal to each other. The gimbal in turn is mounted on a ratchet-sleeve arrangement 64, again symbolic of linear adjusting means. In this instance three transducers 66, 67, 68 of fundamental frequencies $f_1$, $f_2$, $f_3$, respectively, are mounted in the member 60 and are oriented as shown in the elevation of Fig. 4. The transducers 66, 68 are aligned on opposite sides of a diameter of the member 60 and the transducer 67 is mounted adjacent one end of a perpendicular diameter.

As in the foregoing embodiments, a modulator 70 is connected to supply a driving signal to the several transducers through respective matching circuits 71, 71A, 71B. Three receivers 72, 73, 74 are connected to receive signals developed responsive to incidence of reflected waves on the transducers and are tuned respectively to the fundamental frequencies of the transducers 66, 67, 68. The several receivers are connected respectively to time discriminator circuits 75, 76, 78, the functioning of which has already been described. Any one of the time discriminator circuits, and in this case the circuit 78, is connected to a servo drive unit 80 which in turn is connected to a range servo 82 which controls the range of the mount 60. The two transducers 66, 68 disposed at opposite ends of a diameter of the holder 60 are connected through their respective time discriminator circuits to a comparator circuit 84 which in turn is connected to a servo drive unit 85 and a so-called x-servo 86. The time discriminator circuits 75, 78 deliver signals to the comparator circuit 84, the magnitude of which signals depend on the time intervals for propagation and reflection at the transducers 66 and 68.

The circuit, therefore, including the time discriminators 75, 78, the comparator circuit 84 and the servo 86, functions in the manner of the circuit shown in Fig. 2 to control the angular orientation of the mount 60 in the gimbal ring 62A, the axis of rotation of the mount in the ring being normal to the diameter on which the transducers 66, 68 are mounted. However, in this embodiment the mount is also rotatably mounted on a second axis normal to the first as defined by pivotal mounting of the gimbal ring 62A in the gimbal 62. To control its orientation about this axis the relationship between actual time interval and prescribed time interval at the transducer 67 as appearing in the output of discriminator circuit 76 is compared with an average of the same relationships at the transducers 66 and 68, which average represents the relationship which would exist at the center of symmetry of the mount 60. Hence by this comparison, deviations along the diameter on which the transducer 67 is mounted are determined and these deviations are compensated for by rotation of the gimbal ring in the gimbal on an axis normal to this diameter. To make this comparison the outputs of the time discriminator circuits 75, 78 are fed to an averaging circuit 90 which develops a signal proportional to the average of the outputs of these discriminator circuits and delivers this signal to a comparator circuit 92 wherein it is compared with the output of the time discriminator circuit 76. The output of the comparator circuit is fed to a servo drive unit 94 which in turn energizes a so-called y-servo 96 which controls the angular displacement of the mount 60 on the axis of rotation of the gimbal ring 62A.

In Fig. 3 of the three crystals two are illustrated as being mounted on opposite ends of one diameter and the third is mounted adjacent the end of a normal diameter. Alternatively the same two degrees of angular orientation can be accomplished by equal angular spacing of the crystals. In such arrangement, and assuming the three crystals to be identified as A, B and C, the time function of $(B-C)$ will be used to orient the holder about a first axis normal to a line joining the center points of crystals B and C and the time function of $A-(B+C)$ will determine the adjustment of the holder about a second axis normal to the first axis. If the crystals are so placed obvious variations in the associated electrical circuit will permit sensing and controlling of the indicated time functions.

Any number of separate transducers may be employed to control orientation about any number of axes, but for all practical purposes the embodiment of the invention shown in Fig. 3, providing for range control as well as angular orientation control on two axes normal to each other, is all that is required. It will be seen from the foregoing description of the invention that we have provided means whereby an object, say the transducer mount 60 in Fig. 3 or any instrument or device affixed thereto, may be maintained at a given distance and a given angular orientation to a contoured surface during relative lateral movement between the mount 60 and the contoured surface.

For optimum response to contours in the reflecting surface or discontinuity, the crystals should develop a fan-shaped planar beam, the ideal beam being non-directional throughout an angle of 180° and being defined in a plane of infinitesimal depth. The ideal beam shape may be approached with a very narrow crystal, with a lensed crystal, with an irised crystal or with a crystal having any combination of these three features. Moreover, crystals mounted on the same axis as shown in Fig. 2 should produce co-planar beams of the described pattern.

As mentioned above, the invention is equally adapted to control of the relative movement of two objects toward or away from each other by controlling the distance responsive function of propagation and reflection of the ultrasonic waves to a varying rather than a fixed value as for example by means of a computor applying to the comparator circuit a time variant signal. In this manner the objects may be caused to approach or recede from each other in any computed path. In a similar manner angular orientation may be varied by controlled variation of the ratio of distance responsive functions of propagation and reflection of ultrasonic waves from two or more sources.

Although reference has been had to a contoured surface, the invention is not so limited in that it may be made sensitive to any discontinuity including the reverse surface of the remote object or any discontinuity within the object itself. The circuits have been illustrated and described diagrammatically for the reason that modulators, tuned receivers, time discriminator circuits, comparator circuits and averaging circuits are all well known in the art and many types of such circuits may be employed for the purposes here required.

We claim:

1. Apparatus for maintaining a predetermined spatial relationship between two objects not in excess of a few feet apart at least one of which is adjustably supported in space, which comprises a plurality of sources of ultrasonic waves adapted to be affixed to one of said objects in fixed spatial relationship and directed toward the other of said objects, means for causing said sources to generate ultrasonic waves, a fluid medium extending between the objects, receiving means for sensing the reflection of ultrasonic waves from said other of said objects to said sources, means for developing electrical signals of a magnitude and sense proportional to the time difference between the time interval required for propagation from each of said sources and reflection of said waves to and from said other object and a predetermined time interval, and means sensitive to the magnitude of said signals to control the relative positions of said objects to maintain said signals at a substantially null value.

2. Apparatus for maintaining a predetermined spatial relationship between two objects not in excess of a few feet apart at least one of which is adjustably supported in space, which comprises a plurality of sources of ultrasonic waves adapted to be affixed to one of said objects in fixed spatial relationship and directed toward the other of said objects, means for causing said sources to generate ultrasonic waves, a fluid medium disposed between the objects, receiving means for separately sensing the reflection of ultrasonic waves from said other of said objects to each of said sources, means for developing a first electrical signal of a magnitude and sense proportional to the time difference between the time interval required for propagation and reflection of said waves originating at one of said sources to and from said other object and a predetermined time interval, means sensitive to the magnitude of said first signal to control the spacing of said objects to maintain said signal at a substantially null value, means for developing a second electrical signal of a magnitude and sense proportional to the deviation from a predetermined relationship of the time intervals required for propagation and reflection of waves originating at two of said sources to and from said other object, and means sensitive to the magnitude of said second signal to control the orientation of one of said objects about an axis normal to a line joining the centers of said two of said sources to maintain said second signal at a substantially null value.

3. Apparatus for maintaining a predetermined spatial relationship between two objects not in excess of a few feet apart at least one of which is adjustably supported in space, which comprises three sources of ultrasonic waves adapted to be affixed to one of said objects in fixed spatial relationship and directed toward the other of said objects, means for causing said sources to generate ultrasonic waves, a fluid medium located between the objects, receiving means for separately sensing the reflection of ultrasonic waves from said other of said objects to each of said sources, and means sensitive to the time intervals of propagation from and reflection to each of said sources to control the relative positions of said objects with respect to one another and the angular orientation of one of the objects about perpendicular axes to maintain said time intervals substantially in predetermined relationship.

4. Apparatus according to claim 3 wherein each of said sources has a different fundamental frequency so that reflected waves can be sorted and characterized as to source.

5. Apparatus for maintaining a predetermined spatial relationship between two objects spaced not more than a few feet apart, comprising a plurality of sources for producing ultrasonic waves mounted on one of said objects and adapted to be directed toward the other object, means for causing each of the sources to emit pulses of ultrasonic waves spaced by predetermined intervals of time, means for separately detecting the ultrasonic waves which are reflected from said other object, time discriminator means coupled to the output of the detecting means for providing output signals representative of the difference between the time intervals required for propagation and reflection of the ultrasonic waves emitted by the respective sources and predetermined time intervals, and means coupled to the output of the time discriminator means and to the object upon which the sources are mounted for maintaining the spacing of one of the sources from the other object substantially constant and for maintaining the other sources in a predetermined angular orientation with respect to the other object.

6. Apparatus for maintaining a predetermined spatial relationship between two objects not in excess of a few feet apart and at least one of which is adjustably supported in space, which comprises at least two sources of ultrasonic waves affixed to one of the objects in spaced relationship and directed toward the other of the objects, means for causing each of the sources to emit ultrasonic waves, a fluid medium located between the objects for coupling the ultrasonic waves with said other object, and means sensitive to the time intervals of propagation from and reflection to each of the sources to control the relative positions of the objects and the angular orientation of at least one of the objects on at least one axis.

7. Apparatus for maintaining a predetermined spatial relationship between two objects not in excess of a few feet apart and at least one of which is adjustably supported in space, which comprises at least two sources of ultrasonic waves affixed to one of the objects in spaced relationship and directed toward the other of the objects, means for causing each of the sources to emit ultrasonic waves, a fluid medium located between the objects for coupling the ultrasonic waves with said other object, and means sensitive to the time intervals of propagation from and reflection to each of the sources to control the relative positions of the objects and the angular orientation of at least one of the objects about an axis normal to a line joining the centers of two of said sources.

References Cited in the file of this patent

UNITED STATES PATENTS

| | | |
|---|---|---|
| 2,268,587 | Guanella | Jan. 6, 1942 |
| 2,403,527 | Hershberger | July 9, 1946 |
| 2,421,663 | Tolson | June 3, 1947 |
| 2,427,029 | Stearns | Sept. 9, 1947 |
| 2,464,258 | Prichard | Mar. 15, 1949 |
| 2,476,301 | Jenks | July 19, 1949 |
| 2,493,774 | Moore | Jan. 10, 1950 |
| 2,499,349 | Ayres | Mar. 7, 1950 |
| 2,508,384 | Gross | May 23, 1950 |